M. BIRKIGT.
PISTON.
APPLICATION FILED JAN. 4, 1916.

1,198,993.

Patented Sept. 19, 1916.

Witnesses

Inventor
Marc Birkigt
by James L. Norris
Attorney

UNITED STATES PATENT OFFICE.

MARC BIRKIGT, OF BOIS-COLOMBES, FRANCE.

PISTON.

1,198,993.  Specification of Letters Patent.  Patented Sept. 19, 1916.

Application filed January 4, 1916. Serial No. 70,254.

*To all whom it may concern:*

Be it known that I, MARC BIRKIGT, engineer, citizen of the Republic of Switzerland, residing at Bois-Colombes, Department of Seine, France, have invented certain new and useful Improvements in Pistons, of which the following is a specification.

This invention relates to pistons, more particularly to pistons used in explosion engines.

This invention has for its object to avoid the rotation of the piston rings.

The invention consists in providing a stop means in each of the grooves of the piston head which receive the packing rings, that is to say, at that point of the groove where it is desired that the joint of the piston ring should be, this stop element or means being parallel to the axis of the piston.

The invention further consists in other arrangements which will be more explicitly referred to hereinafter.

Figure 1:
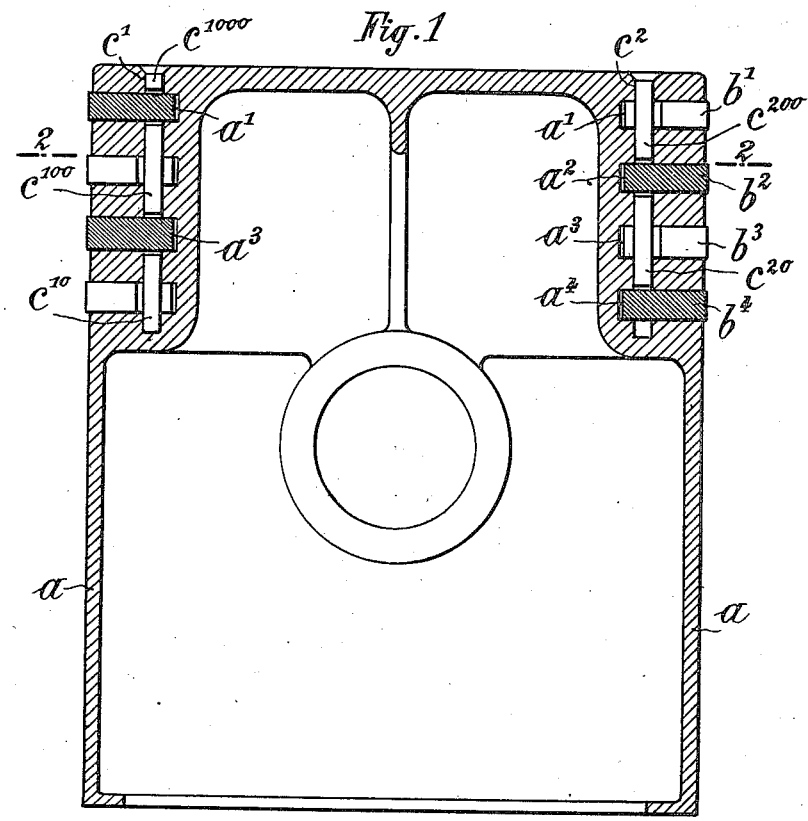
Figure 2:
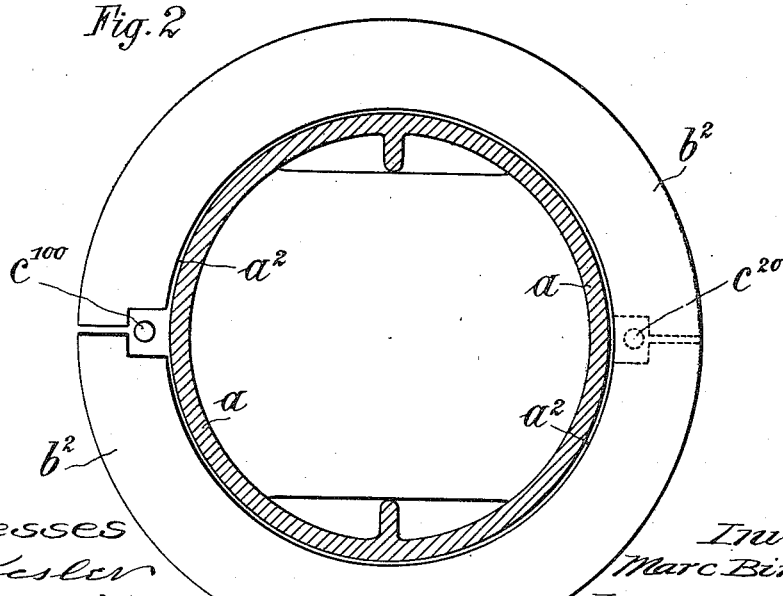

In the accompanying drawing, Figure 1 is an axial section of a piston illustrating the invention applied thereto. Fig. 2 is a cross-section of the same on the line 2—2 of Fig. 1.

The piston $a$ illustrated has four grooves $a^1$ $a^2$ $a^3$ $a^4$ each intended to receive a split ring $b^1$ $b^2$ $b^3$ $b^4$, and the joints of the rings alternate and are diametrically opposite. Two holes $c^1$ and $c^2$ are provided in the body of the said piston $a$ so that the said holes have their axes parallel to the axis of the piston, and are diametrically opposite each other, relatively to the said axis. These holes are made at a distance from the axis, slightly greater than the radius of the bottom of the grooves $a^1$ $a^2$ $a^3$ $a^4$ and starting from the operative face of the piston, extend beyond the groove $a^4$ which is the farthest away from said operative face.

Into the hole $c^1$ is fitted fairly tight a pin $c^{10}$ which is made of a length approximately equal to the distance separating the bottom of the said hole $c^1$ from the lower face of the third groove $a^3$, and the said pin is driven in down to the bottom of the said hole. In the same hole $c^1$ is then fitted also fairly tight, a second pin $c^{100}$ the length of which is made aproximately equal to the distance separating the upper face of the third groove $a^3$ from the lower face of the first groove $a^1$, and the said pin is driven in until its lower end is flush with the upper face of the third groove. Finally, the upper end of the hole $c^1$ is closed by means of a plug $c^{1000}$ of such a length that its lower end does not project beyond the upper face of the first groove $a^1$. Into the hole $c^2$ is fitted in a similar way, a first pin $c^{20}$ which is made of a length approximately equal to the distance separating the upper face of the fourth groove $a^4$ from the lower face of the second groove $a^2$, and the said pin is driven in, until its lower end is flush with the upper face of the said fourth groove. The upper end of the hole $c^2$ is then closed by means of a plug $c^{200}$ forming a pin, of such a length that its lower end should be flush, when it is put in place, with the upper face of the second groove $a^2$. The rings are then fitted into said grooves taking care that the pin in each groove should be between the joint of the corresponding ring.

By this construction the pins prevent the rings from turning or rotating about the piston, and the immovability of the rings is thus insured very simply and without fear that a leakage could take place through the holes $c^1$ and $c^2$ owing to wear.

Each of the split rings, moreover, has a complemental recess in its inner face at its opposite ends, which recesses, when the opposite ends of the ring are in contact, form a slot of such dimensions as to allow the stop pin to extend therethrough.

Obviously the invention is not limited to the construction described, but comprises any modifications within the scope of the appended claims.

Having now particularly described the nature of my said invention and in what manner the same is to be carried out, I declare that what I claim is:—

1. The combination of a piston head formed with a plurality of circumferential grooves and having passages extending from the acting face thereof to a point beyond the innermost groove and extending through the latter, of a packing ring arranged in each groove and provided with an aperture, said rings being so arranged that the apertures thereof alternately register with said passages, and pins disposed in said passages to extend through the apertures of the rings which register with their respective passages.

2. The combination of a piston head formed with a plurality of circumferential grooves, said head having passages extending from the acting face thereof to a point beyond the innermost groove and intersecting said grooves, a split ring arranged in each groove, each of said rings having complemental recesses in its opposite ends to form a slot at the joint of said ends of the ring, the slots of said rings alternately registering with said passages, and a plurality of pins disposed in said passages, each pin preventing rotation of its respective ring on said head.

3. A piston having a plurality of grooves in its circumference and having a plurality of passages extending in parellelism with its axis from the acting face thereof to a point beyond the innermost groove and intersecting said grooves, a plurality of pins in said passages, a ring in each groove and having an aperture to register with one of said passages, said rings being arranged in said grooves to have the pins in each passage extend alternately through said apertures.

In testimony whereof I have hereunto set my hand in presence of two subscribing witnesses.

MARC BIRKIGT.

Witnesses:
 CHAS. P. PRESSLY,
 PAUL PLUM.